US012128898B2

(12) United States Patent
Bare et al.

(10) Patent No.: US 12,128,898 B2
(45) Date of Patent: Oct. 29, 2024

(54) SYSTEMS AND METHODS FOR REDUCING EMISSIONS WITH SMART ALTERNATOR

(71) Applicant: Cummins Inc., Columbus, IN (US)

(72) Inventors: Kristopher R. Bare, Columbus, IN (US); Kenneth M. Follen, Greenwood, IN (US); Xing Jin, Columbus, IN (US); Jinyong Luo, Columbus, IN (US); Manik Narula, Columbus, IN (US); Andrew W. Osburn, Nashville, IN (US); Anant Puri, Greenwood, IN (US); Xiaobo Song, Columbus, IN (US); Ying Yuan, Rexford, NY (US)

(73) Assignee: Cummins Inc., Columbus, IN (US)

( * ) Notice: Subject to any disclaimer, the term of this patent is extended or adjusted under 35 U.S.C. 154(b) by 618 days.

(21) Appl. No.: 17/337,016

(22) Filed: Jun. 2, 2021

(65) Prior Publication Data
US 2022/0388514 A1 Dec. 8, 2022

(51) Int. Cl.
*B60W 20/00* (2016.01)
*B60W 20/20* (2016.01)
(Continued)

(52) U.S. Cl.
CPC ...... *B60W 30/18127* (2013.01); *B60W 20/20* (2013.01); *B60W 20/30* (2013.01); *F02M 31/12* (2013.01)

(58) Field of Classification Search
CPC ........... B60W 30/18127; B60W 20/20; B60W 20/30; B60W 20/16; F02M 31/12;
(Continued)

(56) References Cited

U.S. PATENT DOCUMENTS 6,381,955 B1 5/2002 Morganti et al.
7,073,326 B2 * 7/2006 Cheong .................... F01N 3/05
60/297

(Continued)

FOREIGN PATENT DOCUMENTS

DE 11 2018 000 751 T5 11/2019
DE 10 2018 208 980 A1 12/2019
(Continued)

OTHER PUBLICATIONS

European Search Report on EP 22176532.4 mailed Oct. 28, 2022, 8 pages.
(Continued)

*Primary Examiner* — Masud Ahmed
(74) *Attorney, Agent, or Firm* — FOLEY & LARDNER LLP

(57) ABSTRACT

A method for managing emissions from a vehicle having an aftertreatment system is provided. The method includes: receiving, by a controller, information indicative of a temperature of an aftertreatment system of the vehicle and a power output of an engine of the vehicle; comparing, by the controller, the temperature of the aftertreatment system to a temperature threshold; comparing, by the controller, the power output to a power output threshold; and responsive to the comparisons, commanding, by the controller, an aftertreatment system heater to selectively engage and disengage to warm the aftertreatment system of the vehicle.

16 Claims, 8 Drawing Sheets

(51) Int. Cl.
   *B60W 20/30* (2016.01)
   *B60W 30/18* (2012.01)
   *F02M 31/12* (2006.01)

(58) Field of Classification Search
   CPC ...... F01N 3/025; F01N 3/027; F01N 2240/16; F01N 2560/06; F01N 2590/11; F01N 2900/0602; F01N 2900/08; F01N 2900/10; F01N 2900/1602; F01N 9/00; F01N 3/006; F01N 3/26; F01N 2570/14; Y02T 10/40
   See application file for complete search history.

(56) References Cited

U.S. PATENT DOCUMENTS

| | | | |
|---|---|---|---|
| 8,140,205 B2 | 3/2012 | Hanyu et al. | |
| 8,630,759 B2 | 1/2014 | Bauerle | |
| 8,919,100 B2 | 12/2014 | Verbrugge et al. | |
| 9,823,009 B2* | 11/2017 | Ragazzi | B60H 1/321 |
| 9,956,948 B2 | 5/2018 | Geller | |
| 10,036,288 B2* | 7/2018 | Leone | B60L 1/003 |
| 10,449,847 B2* | 10/2019 | Huang | B60K 6/22 |
| 10,737,699 B2 | 8/2020 | Dickson et al. | |
| 11,339,698 B2* | 5/2022 | Bare | F01N 3/103 |
| 11,428,133 B2* | 8/2022 | Light-Holets | F02D 41/40 |
| 2012/0173062 A1* | 7/2012 | Madurai Kumar | B60W 20/13 903/903 |
| 2017/0254241 A1* | 9/2017 | Everly | G05D 23/30 |
| 2017/0282889 A1 | 10/2017 | Books et al. | |
| 2020/0309005 A1 | 10/2020 | Yonezawa et al. | |
| 2022/0034283 A1* | 2/2022 | Andersson | F01N 3/006 |

FOREIGN PATENT DOCUMENTS

| | | |
|---|---|---|
| DE | 10 2019 119 867 A1 | 1/2021 |
| DE | 10 2019 124 785 A1 | 3/2021 |
| FR | 3081507 A1 | 11/2019 |
| JP | 2015-017515 A | 1/2015 |
| JP | 2016-205353 A | 12/2016 |
| WO | WO-2012/092401 | 7/2012 |

OTHER PUBLICATIONS

CN First Office Action for Application No. 202210615031.2 mailing date Apr. 28, 2023, 14 pages with English translation.

* cited by examiner

SYSTEMS AND METHODS FOR REDUCING EMISSIONS WITH SMART ALTERNATOR

TECHNICAL FIELD

The present disclosure relates to emission reduction strategies. More specifically, the present disclosure relates to reducing emissions through the utilization of regenerative braking energy and/or a smart alternator.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing. Exhaust aftertreatment systems are generally designed to reduce emission of particulate matter, nitrogen oxides, hydrocarbons, and other environmentally harmful pollutants.

Certain hybrid vehicles that include an internal combustion engine and at least one electric motor also aim to meet various emission regulations. Certain of these vehicle include one or more emission treating devices in order to attempt to comply with various emission regulations. With the increase scrutiny on emissions from non-full electric vehicle, it is likely that regulations become stricter over time.

SUMMARY

One embodiment relates to a method for managing emissions from a vehicle, and particularly a hybrid vehicle, having an aftertreatment system. The method includes: receiving, by a controller, information indicative of a temperature of an aftertreatment system of a vehicle and a power output of an engine of the vehicle; comparing, by the controller, the temperature of the aftertreatment system to a temperature threshold; comparing, by the controller, the power output to a power output threshold; and responsive to the comparisons, commanding, by the controller, an aftertreatment system heater to selectively engage and disengage to warm the aftertreatment system of the vehicle. In some examples of this embodiment, the controller engages (i.e., turns on) the heater if the aftertreatment system temperature and power output are both below their respective thresholds, but partially disengages (i.e., operates the heater at a reduced power output relative to a maximum heat output) the heater if the aftertreatment system temperature is below the temperature threshold but the power output is above the power output threshold. Beneficially, dynamic engagement of the heater in this situation causes more efficient use of available energy to enable increased exhaust aftertreatment treatment system temperatures, which causes increased efficiency of the aftertreatment system to reduce emissions from the associated vehicle (e.g., a reduction in nitrous oxide (NOx) emissions).

Another embodiment relates to a method for managing emissions from a hybrid vehicle having an aftertreatment system. The method includes: receiving, by a controller, information indicative of an operation of an engine of a vehicle; determining, by the controller and based on the information indicative of the operation of the engine, a shift event for a transmission coupled to the engine; commanding, by the controller, an increased load on the engine to decrease a speed of the engine, the increased load causing the engine to generate additional power; directing, by the controller, the additional power to an aftertreatment system heater of the vehicle; and, implementing, by the controller, the determined shift event with the transmission. In some examples of this embodiment, the controller increases a load on the engine to lower the engine speed to match a shift speed, and converts the excess energy generated by the higher load to electrical power to power an aftertreatment system heater.

Another embodiment relates to a system for managing emissions from a hybrid vehicle having an aftertreatment system. The system includes a hybrid vehicle comprising a motor generator, the motor generator receiving energy from at least a regenerative braking system; and a controller coupled to the motor generator and comprising at least one processor coupled to a memory storing instructions therein that, when executed by the at least one processor, cause the at least one processor to perform operations comprising: receive information indicative of a temperature of an aftertreatment system of the hybrid vehicle and a power output of an engine of the hybrid vehicle; compare the temperature of the aftertreatment system to a temperature threshold; compare the power output to a power output threshold; and responsive to the comparisons, command an aftertreatment system heater to selectively engage and disengage to warm an aftertreatment system of the hybrid vehicle. In some examples of this embodiment, the controller engages the heater if the aftertreatment system temperature and power output are both below their respective thresholds, but totally disengages the heater if the aftertreatment system temperature is above a threshold value at which the aftertreatment system could be damaged. Beneficially, dynamic engagement of the heater in this situation causes more efficient use of available energy and other resources while avoiding long-term damage.

Another embodiment relates to a non-transitory computer readable medium having computer-executable instructions embodied therein that, when executed by a computing system, causes the computing system to perform operations including: receiving information indicative of operation of a vehicle; comparing the information indicative of the vehicle operation to a threshold value; and responsive to the comparison, sending a command to one or more components of the vehicle.

This summary is illustrative only and is not intended to be in any way limiting. Other aspects, inventive features, and advantages of the systems, apparatuses, methods and/or processes described herein will become apparent in the detailed description set forth herein, taken in conjunction with the accompanying figures, wherein like reference numerals refer to like elements.

DETAILED DESCRIPTION

Figure 1:
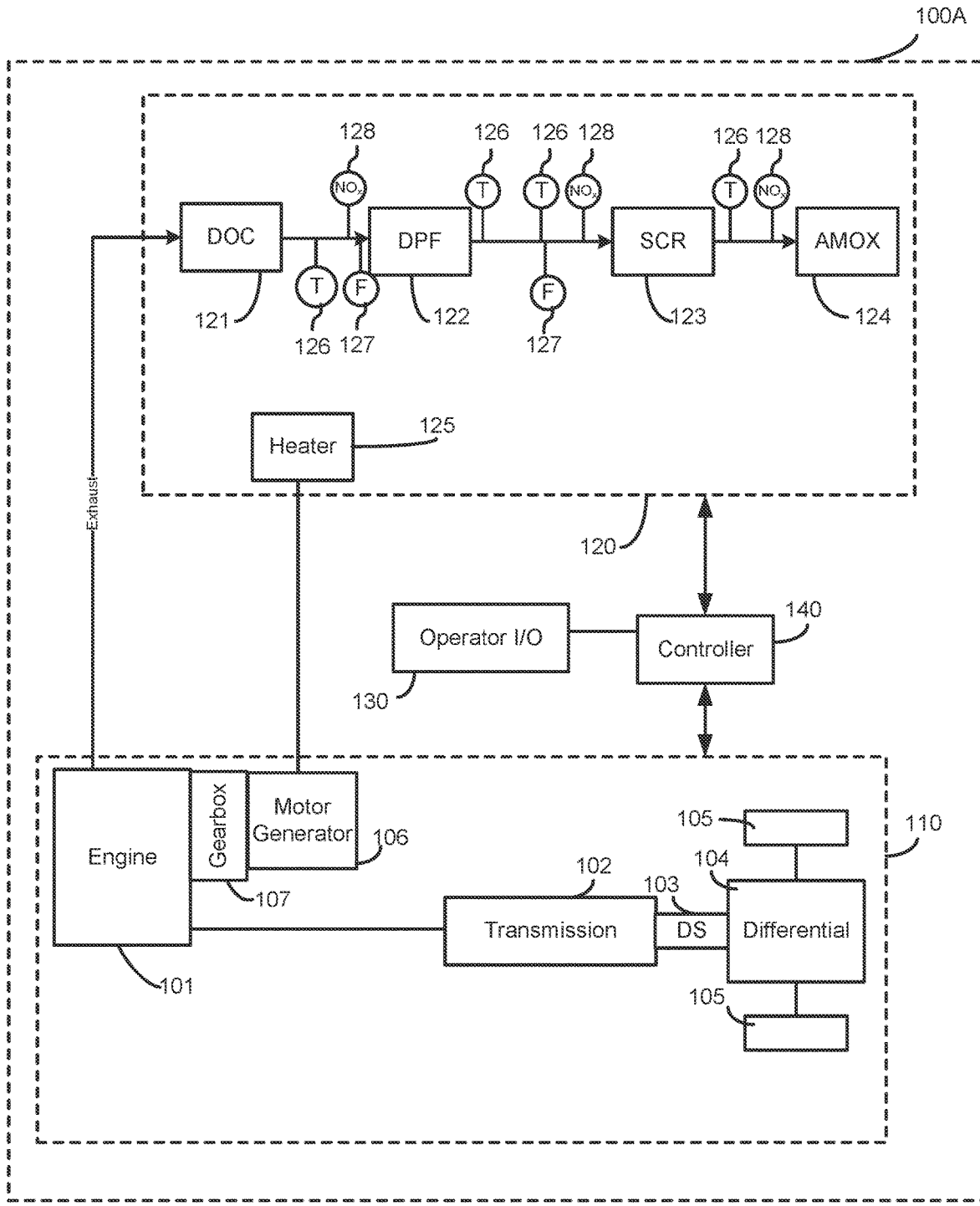
FIG. 1 is a schematic diagram of a first architecture for a vehicle with a controller, according to an exemplary embodiment.

Following below are more detailed descriptions of various concepts related to, and implementations of, methods, apparatuses, and systems for reducing emissions by utilizing regenerative braking energy for a smart alternator. According to the present disclosure, a controller is coupled to various components of a hybrid vehicle, including an engine, a motor generator, and a heater disposed in an exhaust aftertreatment system of the vehicle. The controller receives information indicative of operation of the hybrid vehicle, including a temperature of an aftertreatment system and a power output of the engine. The controller also receives information regarding an availability of free energy (e.g., regenerative braking energy). Based on this information and on the amount of available free energy (e.g., regenerative braking energy), the controller takes certain actions to reduce harmful emissions from the vehicle. These actions may include engaging a heater in the aftertreatment system, initiating or commanding an upshift event for a transmission of the vehicle, and initiating or commanding a downshift event for the transmission. By leveraging these various actions, the controller can improve operation of the vehicle, particularly with regard to shift events, while simultaneously harnessing available energy to improve aftertreatment system conversion efficiency to reduce emissions. Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

As used herein, the term "smart alternator" refers to an alternator structured to receive energy (e.g., mechanical energy from an engine, regenerative braking energy from a braking system), convert that energy to electrical energy, and dynamically power one or more components based on an amount of available energy. A traditional alternator is a fixed voltage alternator that provides a fixed voltage output. Compared to a traditional alternator, a "smart alternator" may provide a dynamic power output based on various vehicle operating conditions. In turn, the load on the engine from the smart alternator may be variable, which may lead to improved vehicle operation characteristics (e.g., fuel savings). In the description herein, the "smart alternator" is shown as a motor generator thereby implying its dual capabilities of being a motor and a generator. In other embodiments, the "smart alternator" may take a different structure.

As also used herein, the term "regenerative braking energy" refers to energy that is captured (e.g., by an electric traction motor) while the vehicle is slowing down or braking. As described herein, this kinetic energy is captured by the motor generator. In contrast to conventional braking systems where this kinetic energy is converted to heat as a result of braking friction, systems that recover this braking energy convert that braking or kinetic energy into usable electrical energy and are hence referred to as regenerative braking systems, energy recovery systems, and the like. This regenerative braking energy may also be referred to as "free energy" signifying that it's created as a byproduct of operation such that it's largely "free."

Referring now to FIGS. 1-4, example vehicle architectures 100A, 100B, 100C, and 100D (collectively referred to herein as vehicle 100, insomuch as 100A-D share similar components and features) are shown. In each of FIGS. 1-4, the vehicle 100 includes a powertrain system 110, an aftertreatment system 120, an operator input/output (I/O) device 130, and a controller 140, where the controller 140 is communicably coupled to each of the aforementioned components. As shown in FIGS. 1-4, the vehicle 100 is a hybrid vehicle. The hybrid vehicle 100 includes an engine 101, a motor generator 106 (i.e., smart alternator), and a transmission 102. The vehicle 100 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, fire trucks, concrete trucks, delivery trucks, locomotives, marine vehicles, aviation vehicles, and other types of vehicles. In another embodiment, the vehicle 100 a stationary piece of equipment, such as a power generator or genset. Thus, the present disclosure is applicable with a wide variety of implementations.

The transmission 102 is operatively coupled to a drive shaft 103, which is operatively coupled to a differential 104, where the differential 104 transfers power output from the engine 101 (and in some architectures, from the motor generator 106) to the final drive (shown as wheels 105) to propel the vehicle 100. In some of the vehicle architectures 100A-D, a clutch 108 is shown. The transmission 102 includes a plurality of settings (e.g., gears) that manipulate the engine speed to achieve a desired drive shaft and final drive speed. For example, the transmission 102 may be a ten-speed transmission as is typical with many semi-trucks. The transmission may be an automatic or a manually operated transmission. The clutch 108 allows the engagement and disengagement of the engine 101 from the motor generator 106 and/or transmission 102.

The engine 101 is an internal combustion engine (e.g., compression-ignition or spark-ignition), such that it can be powered by any fuel type (e.g., diesel, ethanol, gasoline, etc.). The engine 101 includes one or more cylinders and associated pistons. In the example shown, the engine 101 is a diesel powered compression-ignition engine. Air from the atmosphere is combined with fuel, and combusted, to produce power for the vehicle. Combustion of the fuel and air in the compression chambers of the engine 101 produces exhaust gas that is operatively vented to an exhaust pipe and to the exhaust aftertreatment system.

The vehicle 100 also includes a motor generator 106. The motor generator 106 is structured to generate and provide electrical energy to one or more vehicle accessories (hence, generator). The motor aspect is structured to selectively provide output power to the vehicle to at least partly drive the vehicle. That said and although referred to as a "motor generator" 106 herein, thus implying its ability to operate as both a motor and a generator, it is contemplated that the motor generator component, in some embodiments, may be an electric generator or alternator separate from the electric motor (i.e., two separate components) or just an electric motor. Further, the number of electric motors, generators, or motor generators may vary in different configurations.

Among other features, the motor generator 106 may include a torque assist feature, a regenerative braking energy capture ability, and a power generation ability (i.e., the generator aspect). As such, the motor generator 106 may generate power from at least two sources: either by converting mechanical energy from engine 101 fueling or by converting kinetic energy captured from regenerative braking. Using one or more of these power sources, the motor generator 106 may generate an electrical power output and assist with transmission shifts and/or provide power to one or more accessories to enable their use (e.g., an aftertreatment system heater 125). The motor generator 106 may include power conditioning devices such as an inverter and motor controller, where the motor controller may be coupled to the controller 140. In other embodiments, the motor controller may be included with the controller 140.

In operation, when the vehicle brakes are applied, the motor generator 106 may reverse its rotational operation to generate electricity. In this way, the kinetic energy of the vehicle drives reverse operation of the motor generator 106 to cause electrical power generation as compared to a motor output to drive the vehicle. In embodiments that include a battery or other energy storage device, the generated electricity may be captured for use by components in the system 100 (e.g., the heater 125). In the embodiments depicted and as described herein, a battery or analogous energy storage device (e.g., a series of capacitors or ultra-capacitors) is not included. Thus, the controller 140 may direct generated electricity from the motor generator 106 directly or substantially directly from the motor generator 106 to one or more accessories, such as the heater 125. In this way, the controller 140 controls the power consumption and operating capability of electrified accessories in the vehicle. It should be understood that other braking systems (e.g., friction brakes via drum brakes) may also be included with the vehicle such that the regenerative braking system is not meant to define the only type of braking in the vehicle.

The aftertreatment system 120 is in exhaust-gas receiving communication with the engine 101. The aftertreatment system includes a diesel particulate filter (DPF) 122, a diesel oxidation catalyst (DOC) 121, a selective catalytic reduction (SCR) system 123, an ammonia oxidation catalyst (AMOX) 124, and a heater 125. The DOC 121 is structured to receive the exhaust gas from the engine 101 and to oxidize hydrocarbons and carbon monoxide in the exhaust gas, among its other functions such as NO oxidation to NO2 to promote passive DPF regeneration and fast SCR reaction. The DPF 122 is arranged or positioned downstream of the DOC 121 and structured to remove particulates, such as soot, from exhaust gas flowing in the exhaust gas stream. The DPF 122 includes an inlet, where the exhaust gas is received, and an outlet, where the exhaust gas exits after having particulate matter substantially filtered from the exhaust gas and/or converting the particulate matter into carbon dioxide. In some implementations, the DPF 122 may be omitted.

The aftertreatment system 120 may further include a reductant delivery system which may include a decomposition chamber (e.g., decomposition reactor, reactor pipe, decomposition tube, reactor tube, etc.) to convert a reductant into ammonia. The reductant may be, for example, urea, diesel exhaust fluid (DEF), Adblue®, a urea water solution (UWS), an aqueous urea solution (e.g., AUS32, etc.), and other similar fluids. A diesel exhaust fluid (DEF) is added to the exhaust gas stream to aid in the catalytic reduction. The reductant may be injected upstream of the SCR catalyst member by a DEF doser such that the SCR catalyst member receives a mixture of the reductant and exhaust gas. The reductant droplets then undergo the processes of evaporation, thermolysis, and hydrolysis to form gaseous ammonia within the decomposition chamber, the SCR catalyst member, and/or the exhaust gas conduit system, which leaves the aftertreatment system 120. The reductant may also be gaseous ammonia. The aftertreatment system 120 may further include an oxidation catalyst (e.g. the DOC 121) fluidly coupled to the exhaust gas conduit system to oxidize hydrocarbons and carbon monoxide in the exhaust gas. In order to properly assist in this reduction, the DOC 121 may be required to be at a certain operating temperature. In some embodiments, this certain operating temperature is approximately between 200-500° C. In other embodiments, the certain operating temperature is the temperature at which the HC conversion efficiency of the DOC 121 exceeds a predefined threshold (e.g. the conversion of HC to less harmful compounds, which is known as the HC conversion efficiency).

The SCR 123 is configured to assist in the reduction of NOx emissions by accelerating a NOx reduction process between the ammonia and the NOx of the exhaust gas into diatomic nitrogen and water. If the SCR catalyst member is not at or above a certain temperature, the acceleration of the NOx reduction process is limited and the SCR 123 may not be operating at a necessary level of efficiency to meet regulations. In some embodiments, this certain temperature is approximately 250-300° C. The SCR catalyst member may be made from a combination of an inactive material and an active catalyst, such that the inactive material, (e.g. ceramic metal) directs the exhaust gas towards the active catalyst, which is any sort of material suitable for catalytic reduction (e.g. base metals oxides like vanadium, molybdenum, tungsten, etc. or noble metals like platinum). In some embodiments, the AMOX 124 is included and structured to address ammonia slip by removing excess ammonia from the treated exhaust gas before the treated exhaust is released into the atmosphere.

Because the aftertreatment system 120 treats the exhaust gas before the exhaust gas is released into the atmosphere, some of the particulate matter or chemicals that are treated or removed from the exhaust gas may build up in the aftertreatment system over time. For example, the soot filtered out from the exhaust gas by the DPF 122 may build up on the DPF 122 over time. Similarly, sulfur particles present in fuel may accumulate in the SCR 123 and deteriorate the effectiveness of the SCR catalyst member. Further, DEF that undergoes incomplete thermolysis upstream of the catalyst may build up and form deposits on downstream components of the aftertreatment system 120. However, these build-ups on (and subsequent deterioration of effectiveness of) these components of the aftertreatment system 120 may be reversible. In other words, the soot, sulfur, and DEF deposits may be substantially removed from the DPF 122 and the SCR 123 by increasing a temperature of the exhaust gas running through the aftertreatment system to recover performance (e.g. for the SCR, conversion efficiency of NOx to N2 and other compounds). These removal processes are referred to as regeneration events and may be performed for the DPF 122, SCR 123, or another component in the aftertreatment system 120 on which deposits develop. However, exposure to high temperatures during active regenerations degrades the DOC, DPF, and SCR catalysts. An active regeneration event is specifically commanded, such as a flow rate measurement through a DPF being below a predefined threshold indicating a partially blocked DPF which, in turn, causes the controller to command a regeneration event where exhaust gas temperatures are elevated in order to raise the temperature of the DPF and burn off the accumulated PM and other components (e.g., raise engine power output, fuel injection, and other means to increase exhaust gas temperatures to cause a regeneration event). In contrast, a passive regeneration event occurs naturally during operation of the vehicle (e.g., a high load condition that may be experience while traversing a hill causes an increase in exhaust gas temperatures and regeneration event occurs naturally—not specifically commanded).

In some embodiments, the heater 125 is located in the exhaust flow path before the aftertreatment system 120 and is structured to controllably heat the exhaust gas upstream of the aftertreatment system 120. In some embodiments, the heater 125 is located directly before the DOC 121, while in other embodiments, the heater 125 is located directly before the reductant delivery system, directly before the SCR 123, or is located directly before the AMOX 124. The heater 125 may be any sort of external heat source that can be structured to increase the temperature of passing exhaust gas, which, in turn, increases the temperature of components in the aftertreatment system 120, such as the DOC 121 or the SCR 123. As such, the heater may be an electric heater, a grid heater, a heater within the SCR 123, an induction heater, a microwave, or a fuel-burning (e.g., HC fuel) heater. In the example shown, the heater 125 is electrically-powered and controlled by the controller 140 (such as during an active regeneration event in order to heat the exhaust gas (e.g., by convection)). Alternatively, the heater may be positioned proximate a desired component to heat the component (e.g., DPF) by conduction (and possibly convection). Multiple heaters may be used with the exhaust aftertreatment system, and each may be structured the same or differently (e.g., conduction, convection, etc.).

Although the aftertreatment system 120 shown includes a DOC 121, DPF 122, SCR 123, and AMOX 124 positioned in specific locations relative to each other along the exhaust flow path, in other embodiments, the exhaust aftertreatment system may include more than one of any of the various catalysts positioned in any of various positions relative to each other along the exhaust flow path as desired. Additionally, one or more components may be omitted (e.g., AMOX 124). Further, although the DOC 121 and AMOX 124 are non-selective catalysts, in some embodiments, the DOC 121 and AMOX 124 catalyst can be selective catalysts. Thus, a wide variety of architectures are possible without departing from the scope of the present disclosure.

Referring still to FIGS. 1-4, an operator input/output (I/O) device 130 is also shown. The operator I/O device 130 may be coupled to the controller 140, such that information may be exchanged between the controller 140 and the I/O device 130, wherein the information may relate to one or more components of FIG. 1 or determinations (described below) of the controller 140. The operator I/O device 130 enables an operator of the vehicle 100 to communicate with the controller 140 and one or more components of the vehicle 100 of FIG. 1. For example, the operator input/output device 130 may include, but is not limited to, an interactive display, a touchscreen device, one or more buttons and switches, voice command receivers, etc. In this way, the operator input/output device 130 may provide one or more indications or notifications to an operator, such as a malfunction indicator lamp (MIL), etc. Additionally, the vehicle may include a port that enables the controller 140 to connect or couple to a scan tool so that fault codes and other information regarding the vehicle may be obtained.

Figure 5:
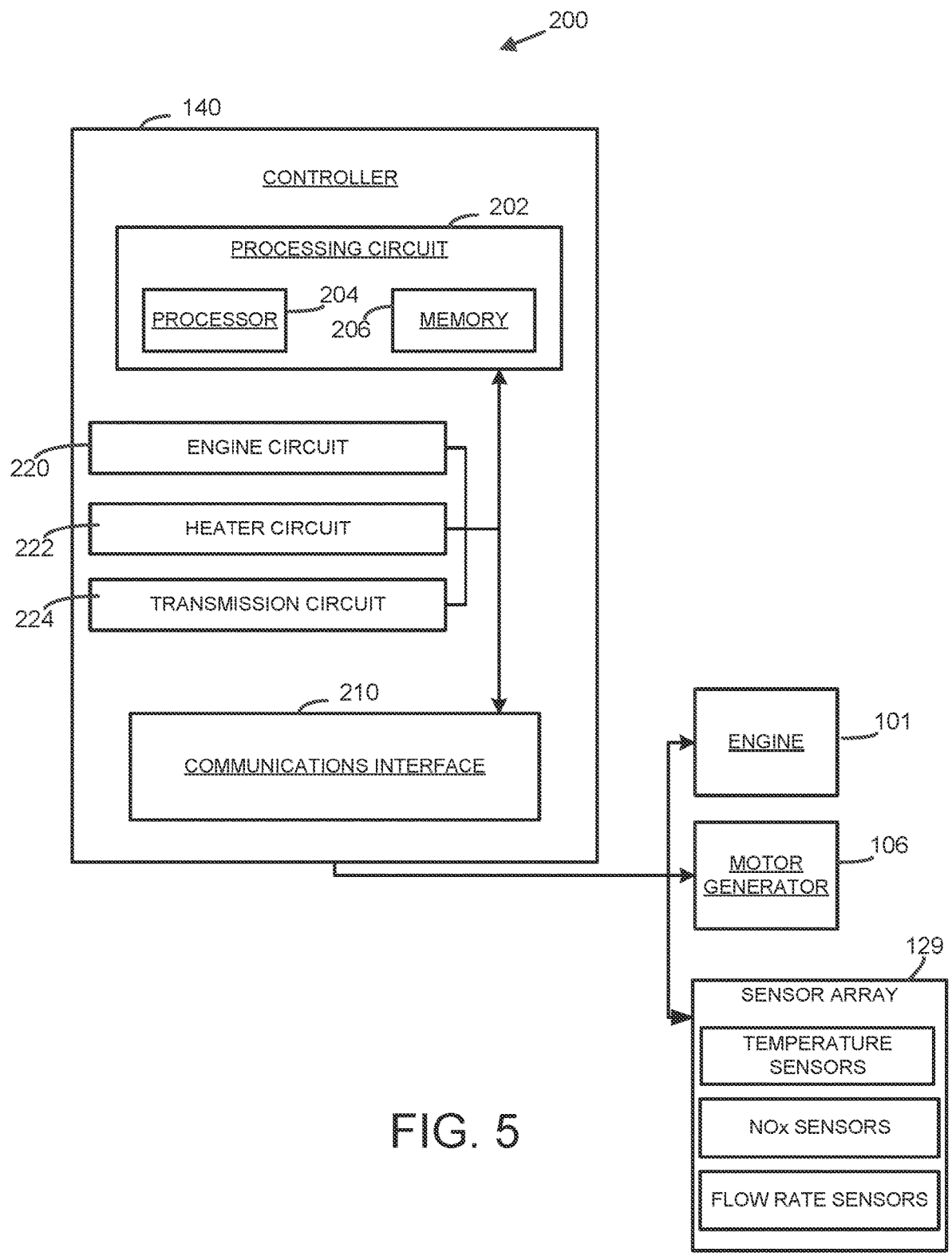
FIG. 5 is a schematic diagram of the controller of FIGS. 1-4, according to an exemplary embodiment.

Briefly referencing FIG. 5, as also shown, a sensor array 129 is included in the aftertreatment system 120. The sensors are coupled to the controller 140, such that the controller 140 can monitor and acquire data indicative of operation of the vehicle 100. In this regard, the sensor array includes NOx sensors 128, flow rate sensors 127, and temperature sensors 126. The NOx sensors 128 acquire data indicative of or, if virtual, determine a NOx amount at or approximately at their disposed location. The flow rate sensors 127 acquire data indicative of or, if virtual, determine an approximate flow rate of the exhaust gas at or approximately at their disposed location. The temperature sensors 126 acquire data indicative of or, if virtual, determine an approximate temperature of the exhaust gas at or approximately at their disposed location. It should be understood that the depicted locations, numbers, and type of sensors is illustrative only. In other embodiments, the sensors may be positioned in other locations, there may be more or less sensors than shown, and/or different/additional sensors may also be included with the vehicle 100 (e.g., a pressure sensor, oxygen sensor, exhaust gas constituent sensors, etc.). Those of ordinary skill in the art will appreciate and recognize the high configurability of the sensors in the vehicle 100.

The controller 140 is structured to control, at least partly, the operation of the vehicle 100 and associated sub-systems, such as the engine 101, the motor generator 106, the heater 125, and the operator input/output (I/O) device 130. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIGS. 1-4, the controller 140 is structured to receive data from one or more of the components shown in FIGS. 1-4. The structure and function of the controller 140 is further described in regard to FIG. 5.

Figure 2:
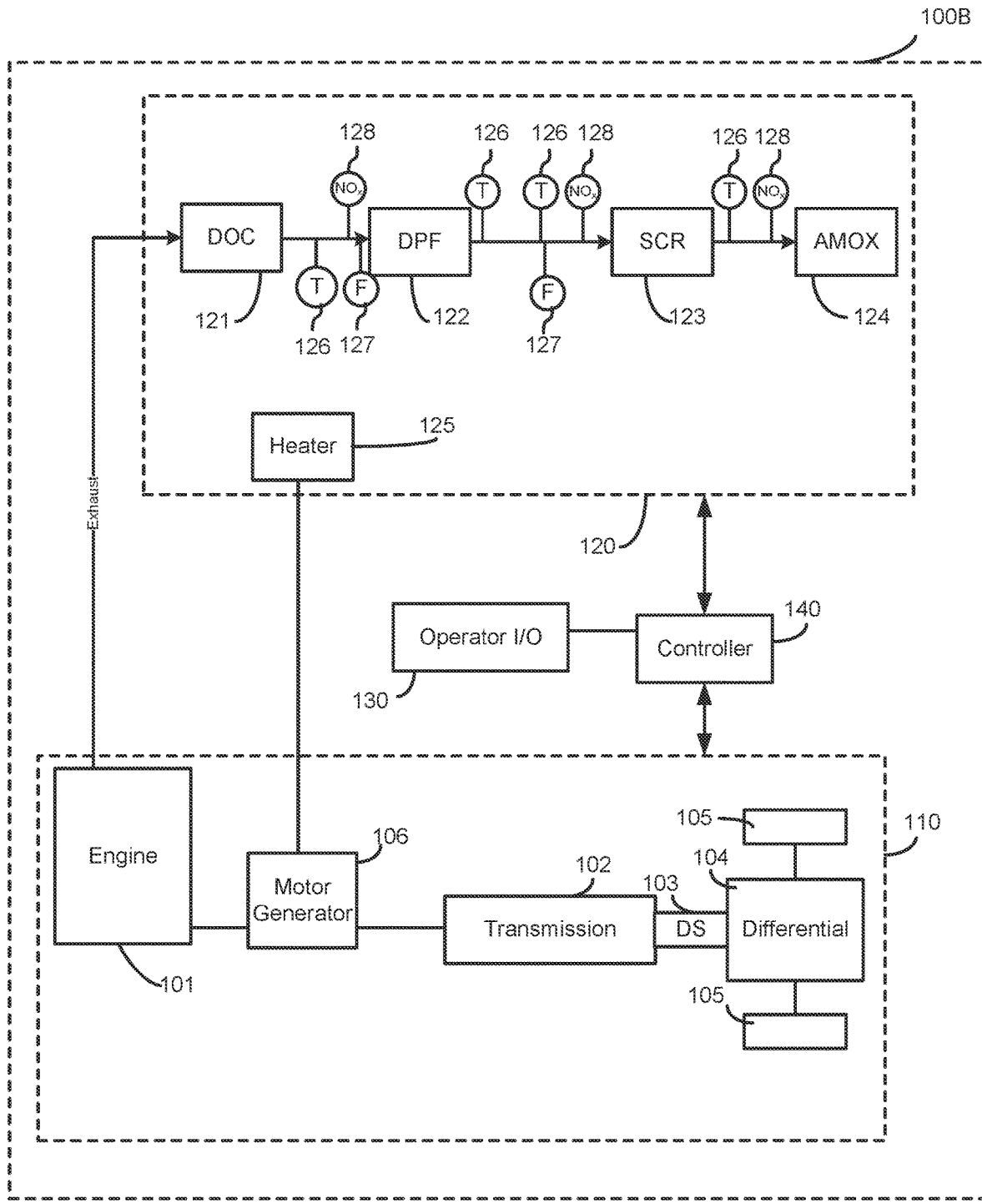
FIG. 2 is a schematic diagram of a second architecture for a vehicle with a controller, according to an exemplary embodiment.
Figure 3:
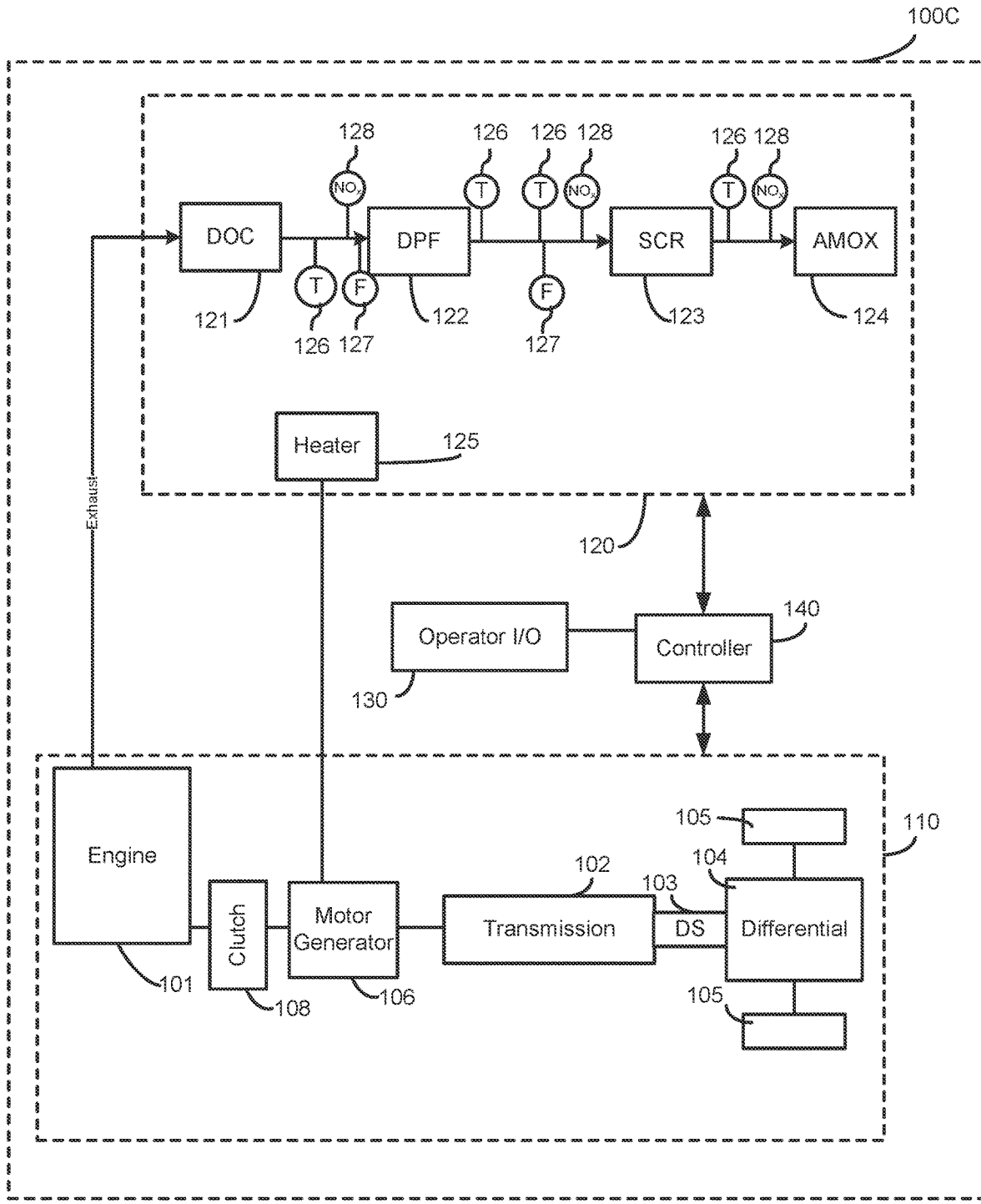
FIG. 3 is a schematic diagram of a third architecture for a vehicle with a controller, according to an exemplary embodiment.
Figure 4:
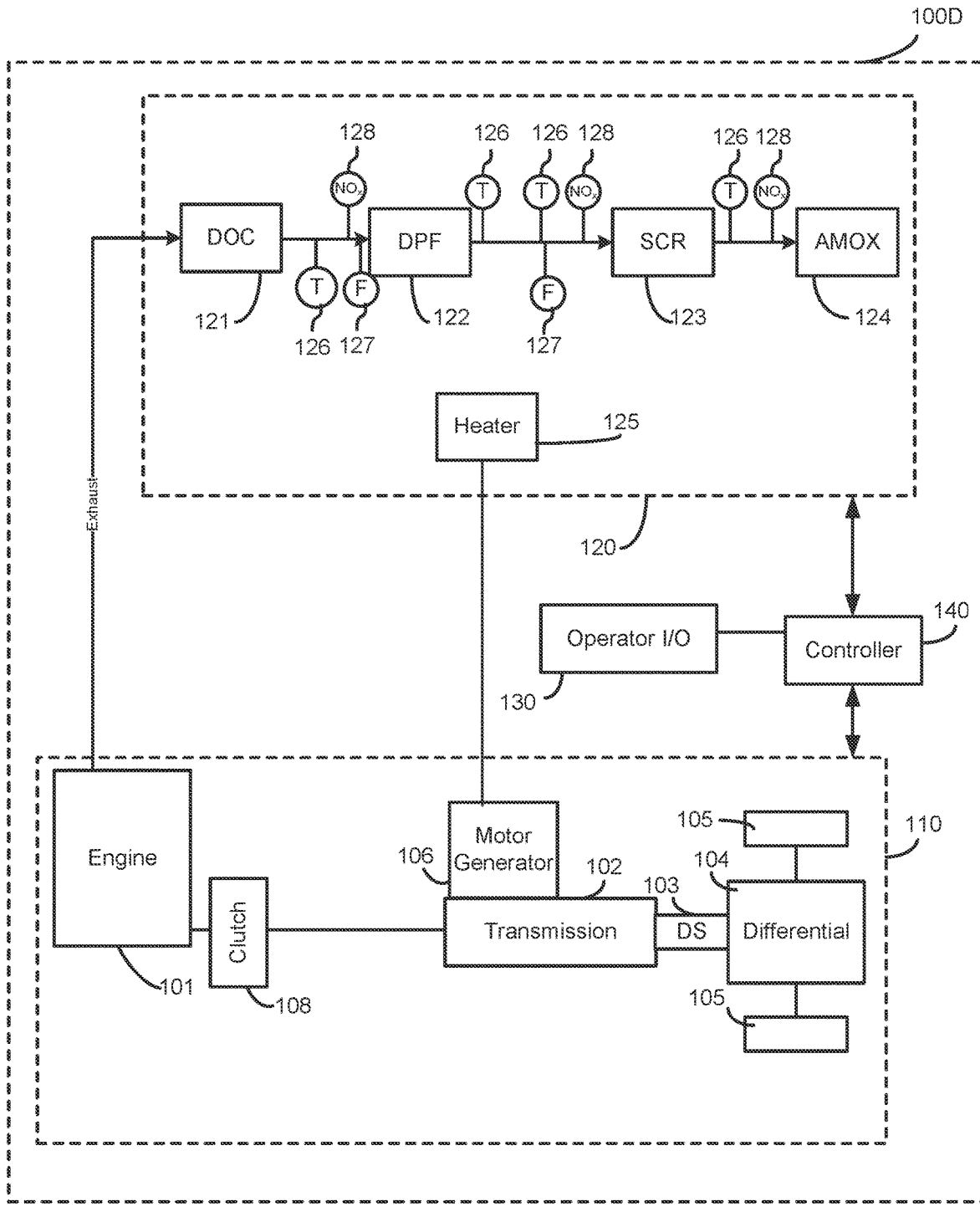
FIG. 4 is a schematic diagram of a fourth architecture for a vehicle with a controller, according to an exemplary embodiment.

Referring now more particularly to FIGS. 1-4, various vehicle architectures for the hybrid vehicle 100 are shown in more detail. In FIG. 1, the vehicle architecture 100A includes a gearbox 107 located between the engine 101 and the motor generator 106. Further, in the vehicle architecture 100A of FIG. 1, the motor generator 106 is not operatively coupled to the transmission 102 but instead in parallel with the engine 101 and the heater 125 of the aftertreatment system 120. Referring now to FIG. 2, the vehicle architecture 100B includes the motor generator 106 in parallel with the engine 101 and the heater 125 of the aftertreatment system 120, in addition to being operatively coupled to the transmission 102. Further, there is no gearbox 107 in the vehicle architecture 100B. Referring now to FIG. 3, the vehicle architecture 100C includes the clutch 108 and the motor generator 106 in parallel with the engine 101 and the heater 125 with the engine 101 and the transmission 102. Referring now to FIG. 4, the vehicle architecture 100D includes the clutch 108 in parallel with the engine 101 and the transmission 102. The motor generator 106 is operatively coupled to the transmission 102 and to the heater 125, but the motor generator 106 is not directly coupled to the engine 101. Although vehicle architectures 100A-D are discussed throughout, the systems and methods described herein are applicable to any hybrid architecture (i.e., any architecture utilizing a fuel-burning engine and a motor generator/alternator).

Furthermore and in the examples depicted, none of the vehicle architectures 100A-100D shown in FIG. 1-4 include a battery(ies) or analogous energy storage device(s), such that kinetic energy is harnessed by the motor generator (either via engine 101 power or from regenerative braking) and 'stored' in the vehicle 100 as thermal energy in the aftertreatment system 120. In this way, the vehicle 100 operates more efficiently by avoiding energy waste that can be associated with storage in a battery, and reduces overall vehicle 100 maintenance by removing a maintenance-prone component from the vehicle 100. Additionally, by utilizing 'free energy' (i.e., energy that is already available and not specially generated) rather than building up reserves in a battery, the vehicle 100 is operating in a more environmentally conscious manner by avoiding the generation of additional pollutants (e.g., running the engine in order to charge a battery). In other alternate embodiments, one or more electrical storage devices may be included with the vehicle (e.g., storage capacitors, batteries, etc.). Further and because a dedicated energy storage device is not included with the vehicle in these exemplary vehicle architectures, it should be understood that electrically-powered accessories may include their own on-board electrical storage devices that store at least a critical amount of electrical energy for powering the associated accessory for at least a minimum amount of time.

As the components of FIG. 1 are shown to be embodied in the vehicle 100, the controller 140 may be structured as one or more electronic control units (ECUs), such as a microcontroller. The function and structure of the controller 140 is described in greater detail in FIG. 5. The controller 140 may be separate from or included with at least one of a transmission control unit, an exhaust aftertreatment control unit, a powertrain control module, an engine control module, etc. In some instances, the transmission control unit, engine control unit, etc. may be included with the controller 140. The function and structure of the controller 140 is described in greater detail in FIG. 5.

Referring now to FIG. 5, a schematic diagram of the controller 140 of the vehicle 100 of FIGS. 1-4 is shown according to an example embodiment. As shown in FIG. 5, the controller 140 includes a processing circuit 202 having a processor 204 and a memory 206, an engine circuit 220, a heater circuit 222, a transmission circuit 224, and a communications interface 210. The controller 140 is structured to receive information indicative of an operation of the vehicle 100, and take one or more actions based on that information and on an amount of available regenerative braking energy. These actions may include engaging the heater 125 if regenerative braking energy is available and/or if the aftertreatment system 120 temperature is within a range, facilitating an upshift event, or initiating a downshift event, in order to improve aftertreatment system 120 temperature and reduce emissions.

The amount of available regenerative braking energy refers to an amount of kinetic energy that has been captured by the motor generator 106 from vehicle braking. In some embodiments, a determination of the amount of available regenerative braking energy may be made based on one or more sensors that provide data indicative of an amount of kinetic energy captured (e.g., via a capacitance sensor within the motor generator 106). For example, a sensor may be included with the motor generator 106 that indicates when the motor generator is operating in reverse which is the "generating" mode. When this reverse operation is identified by the controller 140, the controller 140 may determine that i) regenerative braking energy is available, and ii) direct the available regenerating braking energy (i.e., generated electrical energy at this point from the motor generator 106) to one or more accessories (e.g., heater 125). Thus, the amount determination may be either an actual amount (e.g., X kW) and/or an indication that regenerative braking energy is available (i.e., a binary input of yes/no). This determination may also be made via one or more electrical sensors (e.g., a voltage sensor) that provides data indicative of an amount of in-flowing kinetic energy and/or out-flowing (converted) electrical energy. In other embodiments, the determination is a predicted amount or a predicted time of availability based on look-ahead grade threshold data (i.e., from a telematics device). In these embodiments, the controller 140 determines that a downhill slope is upcoming along a route of the vehicle, and determines an estimated amount of kinetic energy that could be captured from the downhill portion based on a grade of the slope and a length of the portion of the route with downhill slope.

In one configuration, the engine circuit 220, the heater circuit 222, and the transmission circuit 224 are embodied as machine or computer-readable media storing instructions that are executable by a processor, such as processor 204. As described herein and amongst other uses, the instructions facilitate performance of certain operations to enable reception and transmission of data. For example, the instructions of the machine-readable media may provide a command to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the engine circuit 220, the heater circuit 222, and the transmission circuit 224 are embodied as hardware units, such as electronic control units. As such, the engine circuit 220, the heater circuit 222, and the transmission circuit 224 may be embodied as one or more circuitry components including, but not limited to, processing circuitry, network interfaces, peripheral devices, input devices, output devices, sensors, etc. In some embodiments, the engine circuit 220, the heater circuit 222, and the transmission circuit 224 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the engine circuit 220, the heater circuit 222, and the transmission circuit 224 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The engine circuit 220, the heater circuit 222, and the transmission circuit 224 may also include programmable hardware devices such as field programmable gate arrays, programmable array logic, programmable logic devices or the like. The engine circuit 220, the heater circuit 222, and the transmission circuit 224 may include one or more memory devices for storing instructions that are executable by the processor(s) of the engine circuit 220, the heater circuit 222, and the transmission circuit 224. The one or more memory devices and processor(s) may have the same definition as provided below with respect to the memory 206 and processor 204.

In some hardware unit configurations, the engine circuit 220, the heater circuit 222, and the transmission circuit 224 may be geographically dispersed throughout separate locations in the vehicle. Alternatively and as shown, the engine circuit 220, the heater circuit 222, and the transmission circuit 224 may be embodied in or within a single unit/housing, which is shown as the controller 140.

In the example shown, the controller 140 includes the processing circuit 202 having the processor 204 and the memory 206. The processing circuit 202 may be structured or configured to execute or implement the instructions, commands, and/or control processes described herein with respect to the engine circuit 220, the heater circuit 222, and the transmission circuit 224. The depicted configuration represents the engine circuit 220, the heater circuit 222, and the transmission circuit 224 as machine or computer-readable media storing instructions. However, as mentioned above, this illustration is not meant to be limiting as the present disclosure contemplates other embodiments where the engine circuit 220, the heater circuit 222, and the transmission circuit 224, or at least one circuit of the engine circuit 220, the heater circuit 222, and the transmission circuit 224, is configured as a hardware unit. All such combinations and variations are intended to fall within the scope of the present disclosure.

The processor 204 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a suitable processor, a microprocessor, group of processors, etc. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the engine circuit 220, the heater circuit 222, and the transmission circuit 224 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 206 may be communicably connected to the processor 204 to provide computer code or instructions to the processor 204 for executing at least some of the processes described herein. Moreover, the memory 206 may be or include tangible, non-transient volatile memory or non-volatile memory. Accordingly, the memory 206 may include database components, object code components, script components, or any other type of information structure for supporting the various activities and information structures described herein.

The communications interface 210 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 210 may include an Ethernet card and port for sending and receiving data via an Ethernet-based communications network and/or a Wi-Fi transceiver for communicating via a wireless communications network. The communications interface 210 may be structured to communicate via local area networks or wide area networks (e.g., the Internet) and may use a variety of communications protocols (e.g., IP, LON, Bluetooth, ZigBee, radio, cellular, near field communication).

The engine circuit 220 is structured or configured to control, at least partly, and to monitor operation of the engine 101 and to output data or information indicative of engine 101 operation. The engine circuit 220 may control a fuel quantity and rate of fuel injected into the engine, intake/exhaust valve opening, engine speed, engine torque, and other parameters of operation of the engine 101.

The engine circuit 220 may monitor operation of the engine 101 via one or more sensors (either real or virtual) that are configured to provide data indicative of how the engine 101 is operating. These one or more sensors may include a temperature sensor, a torque sensor, a fuel flow sensor, a NOx sensor, an oxygen sensor, a pressure sensor (e.g., exhaust manifold, intake manifold, etc.), etc., and may be positioned at various positions throughout in or around the engine 101. For example, there may be a temperature sensor positioned at or near an exhaust manifold of the engine 101 that provides data indicative of an exhaust gas temperature exiting the engine 101, and there may be a virtual pressure sensor configured to provide data indicative of an in-cylinder pressure of the engine 101 during operation. Furthermore, there may be a torque sensor that provides data indicative of an engine 101 output torque, which, when processed by the engine circuit 220 with the temperature and sensor data, provides a picture of how 'hard' the engine 101 is working (i.e., the stress or load applied to the engine 101). In another example, there may be a NOx sensor similarly positioned at or near the exhaust manifold that provides data indicative of an amount of engine-out NOx (EONOx).

Once the data are received from the one or more sensors, the engine circuit 220 processes the data in order to provide the heater circuit 222 and/or the transmission circuit 224 with actionable data (i.e., information upon which the heater circuit 222 and/or the transmission circuit can base decisions). For example, as discussed above, the engine circuit 220 processes data indicative of an exhaust-out temperature, a pressure, and a torque in order to determine an overall load on the engine 101 and/or a power output from the engine (e.g., X horsepower based on the determined or monitored engine speed and torque output of the engine). In another example, the engine circuit 220 receives data indicative of an intake air-to-fuel ratio (e.g., from the oxygen sensor), which the engine circuit 220 uses, in combination with the other received data, to provide the heater circuit 222 and/or transmission circuit 224 with information regarding an operation state of the engine 101 (i.e., lean or rich burn).

The heater circuit 222 is structured or configured to control the heater 125. The heater circuit 222 controls the heater 125 by issuing commands to the heater 125 that control an amount of heat output from the heater 125 (e.g., as an amount of heat energy or as a percentage of maximum heat output of the heater 125). As such, the heater circuit 222 may command the heater 125 to turn off (i.e., commanding 0% of heat output), to turn on completely (i.e., commanding 100% of maximum heat output), or to turn on partially (e.g., commanding a certain amount or percentage, such as 50%, of maximum heat output). As used herein with respect to controlling the heater 125, the terms "activate" and "engage" are used interchangeably and refer to turning "on" the heater 125. After engagement, the heater circuit 222 controls the power output from the heater 125 as described above (e.g., maximum heater output, less than maximum heater output).

The heater circuit 222 is structured or configured to control the heater 125 based on at least one of an amount of regenerative braking energy captured, on a temperature of the aftertreatment system 120, and/or on a power output of the engine 101. In one embodiment, the temperature of the aftertreatment system 120 is an instantaneous temperature at or near an inlet and/or outlet of the aftertreatment system 120, such that the temperature of the aftertreatment system 120 is indicative of the aftertreatment system 120 as a whole. In another embodiment, the temperature of the aftertreatment system 120 is an instantaneous temperature at or near an individual component of the aftertreatment system 120 (e.g., the DOC 121, the SCR 123, etc.). In yet another embodiment, the temperature of the aftertreatment system 120 is an average or a median of the temperatures of, for example, individual components or temperatures at or near an inlet and/or outlet of aftertreatment system 120 over a predefined amount of time (or, another unit of measure, such as a distance travelled by the vehicle).

As described primarily herein, the temperature of the aftertreatment system may be a temperature of the SCR 123. The temperature may be determined directly by real sensors (i.e., the temperature sensors 126 positioned proximate the SCR), or estimated via one or more virtual sensors. A virtual sensor refers to the utilization of one or more processes to determine a measurement of a value without an actual sensor reading for that particular value. For example, temperature sensors upstream and downstream of the SCR 123 may be used by the heater circuit 222 to determine the temperature of the SCR 123 based on the NOx reduction across the SCR 123. In this regard, a look-up table may be included with the heater circuit 222 that correlates NOx reduction amounts to operating temperature(s) of the SCR 123 (and, in some embodiments, other operating parameters of the vehicle). For example, at certain engine power outputs and hours of operation, the determine NOx reduction amount (as determined by a SCR outlet NOx sensor) may correlate with an operating temperature of the SCR 123. Thus, the SCR 123 temperature may be determined directly (via one or more sensors) or indirectly (e.g., via correlation with a NOx output amount). Further and as described, the temperature used by the heater circuit 222 when evaluating how to control the heater 125 may be an instantaneous temperature of the SCR 123, an average temperature of the SCR 123 over a predefined amount of time (or other metric, such as distance), etc.

The heater circuit 222 determines or receives a determination of a power output of the engine 101 from the engine circuit 220 and compares the determine power output of the engine 101 to a power output threshold. Alternatively and in some embodiments, the heater circuit 222 may receive a determined amount of engine-out NOx (EONOx) from the engine circuit 220 and compare that amount to a threshold EONOx amount, rather than comparing the determined power output to a power output threshold. In either situation, the heater circuit 222 may subsequently control the heater 125.

Based on the temperature of the aftertreatment system 120 and power output (or EONOx) of the engine 101 from the engine circuit 220, the heater circuit 222 determines a command for the heater 125 based on a comparison of the determined temperature and engine 101 power (or EONOx) to one or more threshold values. The one or more threshold values include a first temperature threshold, a second temperature threshold, and a power output threshold. In an alternate embodiment and as briefly mentioned above, the threshold may include an EONOx threshold. The thresholds may be predefined values or ranges in the controller 140 (e.g., set by a technician or manufacturer, provided values over-the-air via a telematics unit from a manufacturer, etc.). The first temperature threshold may be a pre-determined or predefined temperature or temperature range at which the SCR 123 efficiently reduces NOx in the exhaust gas (e.g., approx. 250° C.). The second predefined temperature threshold may be a temperature (e.g., 350° C.) above which thermal damage to the components of the aftertreatment system 120 occurs or is likely to occur. Thus, the second predefined temperature threshold may be higher than the first predefined temperature threshold. In some embodiments, the first and second temperature thresholds include a heat resistance band that provides a buffer on either side of the predefined temperature value such that a temperature range is defined. In this way, the current temperature is not determined as exceeding either threshold until the current temperature exceeds the value of the temperature threshold plus the value of the heat resistance band. For example, if the first temperature threshold is 250° C. and the heat resistance band is 10° C., then the heater circuit 222 does not determine that the current aftertreatment system temperature exceeds the first temperature threshold until the current temperature is at least 260° C. (i.e., 250° C.+10° C.).

The controller 140 may define the power threshold as a power output value or range of values for engine 101 that produce engine-out temperatures above a threshold value. In particular, the controller 140 may define the engine power threshold as a power output value or range of values at which the engine-out temperature is sufficient to warm the aftertreatment system 120 to an efficient operating temperature (i.e., a temperature at which the aftertreatment system 120 reduces pollutants (e.g., NOx) at a desired rate, such as (250° C.).

As mentioned above and in place of the power output value, the controller 140 may compare an EONOx value to an EONOx threshold to at least partly control the heater 125. The EONOx threshold may be a predefined acceptable amount of NOx emissions prior to the SCR 123 reaching a predefined operating temperature or range of temperatures (based on the aftertreatment system 120 temperature being below the first threshold). Like the first and second temperature thresholds, in some embodiments, the power output threshold and EONOx threshold may include buffers to define a range of values such that the nomenclature of a threshold is not meant to be limiting to a single value.

Based on the foregoing, operation of the controller 140 may be described as follows. In one embodiment, the controller 140 determines that the determined aftertreatment system 120 temperature is below both the first temperature threshold and the second temperature threshold and that the engine 101 power output (or, in an alternate embodiment, EONOx) is below the power threshold (or EONOx threshold). In response, the heater circuit 222 engages (i.e., turns on) the heater 125. In this situation, power for the heater 125 is provided by the engine 101 and energy captured from regenerative braking (if any), such that the heater 125 is utilizing the regenerative braking energy in the aftertreatment system 120 as thermal energy. In another embodiment, the controller 140 determines that the determined aftertreatment system 120 temperature is lower than both the first temperature threshold and the second temperature threshold and that the engine 101 power output is above the power threshold. In response, the heater circuit 222 adjusts or disengages the heater 125. For example, in one embodiment, in response to the difference between the engine 101 power output and the power threshold being greater than a threshold (i.e., power output is greater than the power threshold by more than a predefined amount), the heater circuit 222 completely disengages the heater 125 because the power output from the engine 101 is high enough that the generated exhaust gas from the engine 101 is sufficiently hot to warm the aftertreatment system 120 without heater 125 assistance.

In another embodiment, the controller 140 determines that the engine 101 power output is slightly above the power threshold (i.e., the engine 101 power output is within a pre-defined range or percentage value of the power threshold) or determines that the aftertreatment system 120 temperature is slightly below first temperature threshold (i.e., the aftertreatment system 120 temperature is within a pre-defined range or percentage value of the first temperature threshold). In response to one or both of these determinations, the heater circuit 222 adjusts the heater 125 output to low (e.g., 20% heat power) in order to continue providing assistance to the aftertreatment system 120 but at a reduced level so as not to overheat or cause or likely cause damage to the aftertreatment system 120. In this regard, this heater engagement process is occurring before the aftertreatment system (and, particularly, the SCR) is at a desired operating temperature or range of temperatures to reduce emissions (e.g., NOx) at a desired rate.

Additionally, the controller 140 may turn off or lower power consumption of non-necessary accessories in order to reduce a load on the engine 101 and to decrease EONOx. A "non-necessary accessory or vehicle accessory" refers to an accessory that does not affect an ability to operate the vehicle. For example, an electric heating, ventilation, and air conditioning (eHVAC), fan, a radio system, a chair massager, etc. relate to driver comfort and are not "necessary" for vehicle operation. In contrast, electrified coolant valves that maintain desired engine temperatures, power steering, etc. relate to operability of the vehicle and may be classified as "necessary" accessories. By reducing the load on the engine 101, the controller 140 reduces EONOx until the aftertreatment system is operating as desired (i.e., at a desired operating temperature).

The controller 140 may control operation of accessories (e.g., turning one or more accessories on/off, reducing/ increasing a power consumption by one or more accessories) in various operating conditions according to a prioritization scheme or hierarchy. The prioritization scheme defines the criteria for selecting which accessory (and, particularly, non-necessary accessories) to turn off or reduce electrical power consumption from in certain operating conditions. In some embodiments, the prioritization scheme is pre-determined according to relative importance to vehicle 100 performance (e.g., eHVAC is the first to be turned off because it relates only to driver comfort and has no bearing on vehicle 100 performance). In other embodiments, the prioritization scheme may be determined dynamically based on driving conditions (e.g., if the ambient temperature is below freezing, the fan is disengaged before the eHVAC because engine 101 cooling from the fan is not important at such temperatures, and the eHVAC takes on increased importance at such temperatures because the freezing temperatures could pose a danger to the driver if the cabin is not warmed).

In one embodiment, the controller 140 adjusts operation of the non-necessary accessories based on a comparison of the current EONOx amount to a threshold EONOx amount. The threshold EONOx amount may be an acceptable amount of NOx emissions prior to the SCR 123 reaching an operating temperature (based on the aftertreatment system 120 temperature being below the first threshold). Based on an amount that the current EONOx amount exceeds the threshold EONOx amount, the controller 140 adjusts operation of the non-necessary accessories, with a greater the amount of exceedance begetting a greater adjustment by the controller 140. For example, if the determined amount of exceedance is low (meaning the current EONOx amount is close to the threshold EONOx amount, such as within a predefined amount of percentage), the controller 140 may command a decrease in eHVAC function rather than a complete disengagement, such that the eHVAC continues to provide heating and/or cooling to the cabin, but to a lesser degree. Alternatively, if the determined amount of exceedance is high (meaning the current EONOx amount is close to the threshold EONOx amount, such as outside of a predefined amount of percentage), the heater circuit 222 may command one or more non-necessary accessories to disengage (i.e., turn 'off') in order to reduce a load on the engine by a greater amount than in the first example.

Referring still to operation of the controller 140, if the determined temperature is above the first temperature threshold but below the second temperature threshold, regardless of the determined power output, the heater circuit 222 disengages (turns off) the heater unless there is regenerative braking energy available. The controller 140 determines there is regenerative braking energy available in one of three situations: 1) if one or more sensors (e.g., a capacity sensor, voltage sensor, current sensor) indicate that an amount of kinetic energy has been stored as or is currently being converted to electric energy by the motor generator 106; 2) if upcoming road grade data (i.e., from a telematics device) indicate that a downhill slope is upcoming; or 3) if driver power/torque demand (i.e., based on an accelerator pedal position) is below the engine motoring power/torque. If there is regenerative braking energy available or available within a predefined threshold amount of time or distance (e.g., if the downhill slope is upcoming within X miles or under X seconds given the current rate of speed of the vehicle), the heater circuit 222 directs all or mostly all available regenerative braking energy to the heater 125. If the determined temperature is above the second temperature threshold, the heater circuit 222 does not engage (turn on) the heater 125, even if there is regenerative braking energy available. By leveraging the regenerative braking energy when available, the controller 140 and motor generator 106 are strategically capturing regenerative braking energy when available and converting/storing the energy as thermal energy (via the heater 125) in the aftertreatment system 120. The thermal energy is a combination of the instantaneous (i.e., available in that moment in time) regenerative braking energy and/or from engine 101 fueling (such as when the determined temperature and determine engine 101 output are below their respective thresholds). Further, by pre-emptively warming the aftertreatment system 120 using 'free' (i.e., without fueling cost) energy, traditional thermal management is reduced, which reduces CO2 generation, reduces fuel consumption, and improves aftertreatment system 120 component health (by avoiding the high temperatures of traditional thermal management).

Figure 6:
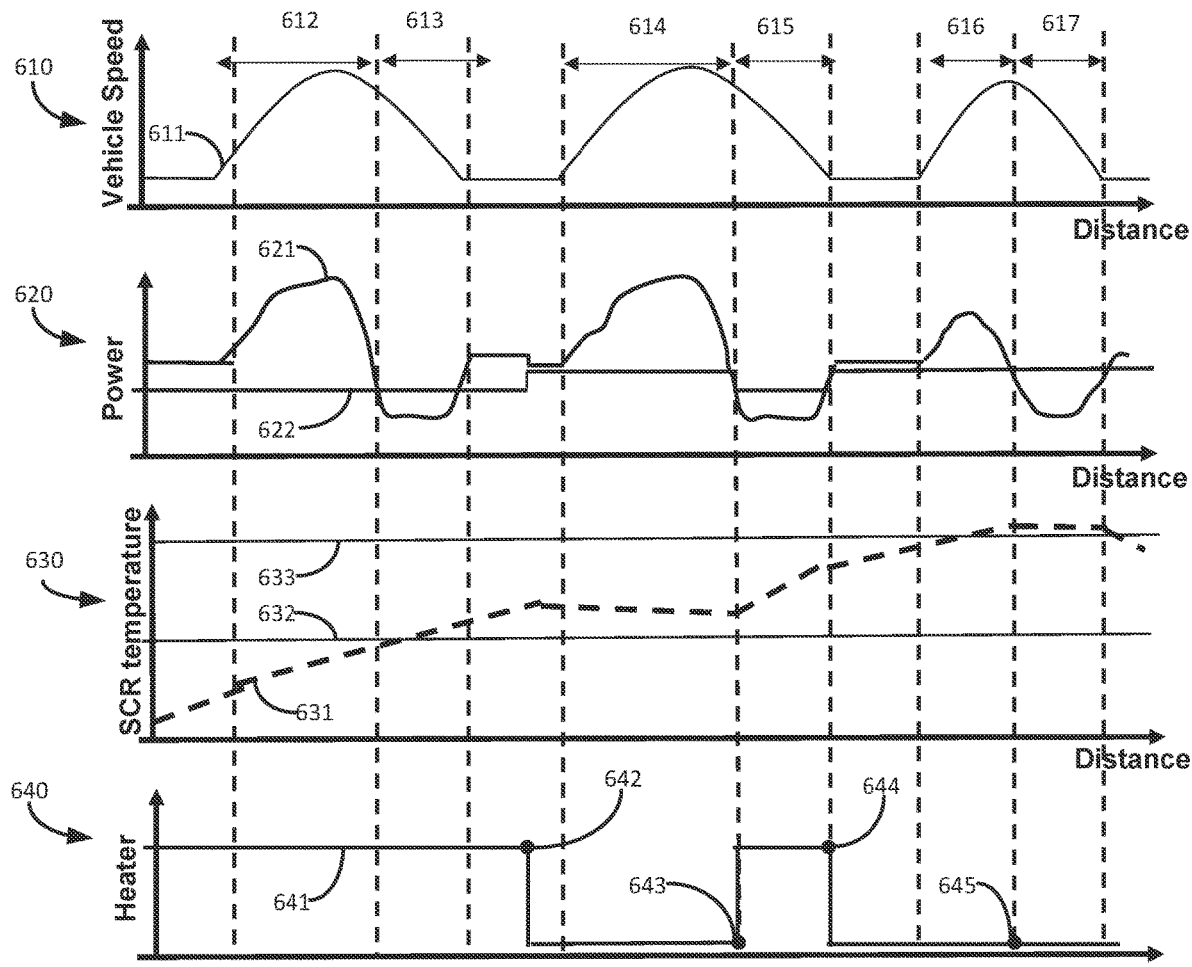
FIG. 6 is a set of plots for operating values of a vehicle relative to a vehicle travel distance, according to an exemplary embodiment.

Referring now to FIG. 6, a set 600 of plots for operating values of the vehicle 100 relative to vehicle travel distance are shown, according to an example embodiment. An x-axis of the set 600 is vehicle travel distance (e.g., in miles). A y-axis for a first or top most plot 610 is speed of the vehicle 100, a y-axis of a second plot 620 is power output, a y-axis of a third plot 630 is temperature of the SCR 123, and a y-axis of a fourth plot 640 is heater status (with 0 being 'off' and 1 being 'on'). Line 611 plots a speed of the vehicle 100 as a function of distance, with intervals 612, 614, and 616 indicating intervals of acceleration and intervals marked 613, 615, and 617 indicating intervals of braking. Line 621 plots a power output of the engine 101 as a function of distance and line 622 plots a power output of the motor generator 106 as a function of distance. Line 631 plots a temperature of the SCR 123 as a function of distance, while line 632 plots a constant value for the first temperature threshold and line 633 plots a constant value for the second temperature threshold. While the third plot 630 depicts the SCR 123 temperature, the third plot 630 could be for any component of the aftertreatment system 120 (e.g., DOC 121, etc.). Line 641 plots a status of the heater 125 as a function of distance. At the point indicated as 642, the heater 125 status switches from 1 ('on') to 0 ('off') due to the value of line 631 being between lines 632 and 633 and there being no regenerative braking energy available (i.e., the value of line 611 is not decreasing). Then, at the point indicated as 643, the heater 125 status switches from 0 to 1, due to regenerative braking energy becoming available (i.e., the value of line 611 is decreasing) and the value of line 631 is not above line 633. At the point indicated as 644, the heater status switches from 1 to 0 due to regenerative braking energy being no longer available and the value of 631 being above line 632. Finally, at the point indicated as 645, the heater 125 status does not change despite regenerative braking energy being available because the value of line 631 is above line 633.

The transmission circuit 224 is structured or configured to receive data from the engine circuit 220 and/or heater circuit 222 and to command one or more components of the vehicle 100 in order to control, at least partly, the transmission 102. In particular, the transmission circuit 224 is structured to facilitate a shift event for the transmission 102. In some embodiments, the transmission circuit 224 is structured or configured to command an additional load on the engine 101, causing the engine 101 to decelerate in order to facilitate a smoother upshift event for the transmission 102. By increasing a load on the engine 101, the transmission circuit 224 causes the speed of the engine 101 to decrease. In some embodiments, the transmission circuit 224 increases the load on the engine 101 by: i) the motor generator 106, which uses the increased load to generate additional power (i.e., for the heater 125); ii) activating one or more currently-disengaged accessories (e.g., turning on the HVAC system if the HVAC system is currently off); and/or iii) increasing a power consumption from one or more accessories. Because an upshift event is smoothest (i.e., quickly and with the fewest noticeable knocks due to gears not poorly meshing) at a particular engine 101 speed, by assisting in decelerating the engine 101 to that particular engine 101 speed (i.e., an engine speed commensurate with the upshift event), the transmission circuit 224 is improving the smoothness of the upshift event.

Based on the foregoing, operation of the transmission circuit 224 may be described as follows. First, the transmission circuit 224 determines whether an upshift event (i.e., shifting from a current gear to a higher gear) is desired. This determination may be made based on operator preference (e.g., received via the operator I/O device 130) or based on external conditions (e.g., the vehicle 100 is descending a hill, and traversal is improved at a higher gear due to the fuel savings that accompany operation in a higher gear). When the transmission circuit 224 determines that an upshift event is desired, the transmission circuit 224 determines a speed of the engine 101 and a target engine 101 speed for the upshift event (i.e., a speed of the engine 101 at which the shift from one gear to another is smoothest). In some embodiments, the target engine 101 speed for the shift event is the same regardless of the current gear or desired higher gear, while in other embodiments, the target engine speed for the shift event is dependent upon one or both of the current gear and the desired higher gear (e.g., the speed is higher for a higher gear). In some of these embodiments, the target engine speed of the engine 101 for the shift event is determined based on a look-up table that associates a desired gear with a corresponding transmission 102 speed and engine 101 speed. The controller 140 may store one or more transmission shift schedules that correlate engine speed to transmission setting. The shift schedules define when a transmission shift event occurs (upshift or downshift) based on the engine speed (and, potentially, other factors). Based on the speed of the engine 101 for the shift event, the transmission circuit 224 determines an amount of deceleration for the engine 101 to reach the target engine speed for the shift event (e.g., 1500 RPM to 1200 RPM). Further, based on the amount of deceleration, the transmission circuit 224 determines an amount of load increase on the engine 101 that would result in the amount of deceleration. Assuming a substantially constant engine 101 power output (i.e., the power demand on the engine 101 is not changed), if a load on the engine 101 is increased, a speed of the engine 101 may decrease in response to the increase in load. As such, the transmission circuit 224 can determine the amount of engine 101 speed deceleration that would correspond with various values for a load increase. The correlation between engine 101 speed reduction and load increases may be defined based on one or more lookup tables that establish the relationship based on testing data, or may be defined based on historical performance of the vehicle 100 that has been stored (e.g., in the memory 206). For example, if during previous operation, a load of X was applied when traveling a speed of Y and the engine 101 speed was reduced by Z, the transmission circuit 224 determines an amount of X based on a current speed of Y and a desired amount of Z.

The transmission circuit 224 then commands an additional load on the engine 101 based on the determined amount of load increase, and directs the additional mechanical energy generated by that additional load to the motor generator 106. From there, the motor generator 106 converts that mechanical energy to thermal energy via the heater 125, thereby warming the aftertreatment system 120 while simultaneously improving the smoothness of the upshift event. As used herein, a 'smooth' shift event refers to a shift event that is substantially free of bumps, knocks, and other types of discomfort that might otherwise be experienced by a user (e.g., driver) during a shift event. Because a shift event involves a moving gear switching from being meshed with a first gear to being meshed with a second gear, it is common to encounter a noticeable bump due to the moving gear not meshing well with the second gear. By decelerating the engine 101 to the target engine speed for the shift event, the transmission circuit 224 reduces the chance of bumping or knocking due to poorly meshed gears.

In another embodiment, the transmission circuit 224 is structured or configured to manage downshift events in order to select a proper gear or setting for high exhaust gas temperature. By managing downshift events, the transmission circuit 224 can increase the temperature of the exhaust gas without additional fueling, thereby warming the aftertreatment system 120 without added fueling costs and with reduced $CO_2$ generation. As discussed above, by increasing a load on the engine 101, the controller 140 (via the transmission circuit 224) can initiate a deceleration of the engine 101. By decelerating the engine 101 to a certain speed, the transmission circuit 224 facilitates a smoother downshift event by matching the engine 101 speed to a speed for the shift event. The engine speed to transmission speed for the shift event may be defined by a transmission shift schedule. Thus, the controller 140 functions to adjust the engine speed to a speed aligned or substantially aligned with the speed for the shift event.

In operation, when there is a downshift event, a load on an engine immediately increases due to the lower transmission setting (e.g., gear). The amount of increase in load is related to the specific gear with lower gears associated with higher loads, such that the lower the gear to which the transmission shifts, the greater the increase in load as a result of that downshift. As a consequence of this increased load, the engine is working harder. The "harder" work leads to increases in power output that generate relatively higher exhaust gas temperatures. These same principles are applied by the transmission circuit 224 to determine a desired gear based on a desired temperature for the exhaust gas. As such, the transmission circuit 224 first determines a desired temperature for the exhaust gas based, in part, on a current temperature of the aftertreatment system 120 (because an increase in exhaust gas temperature leads to an increase in aftertreatment system 120 temperature, due to the hotter exhaust gas flowing through the aftertreatment system 120). If the current temperature of the aftertreatment system 120 is above a desired threshold value (e.g., a temperature above which the SCR 123 is efficiently reducing NOx in the exhaust), the transmission circuit 224 determines that the desired exhaust gas temperature is the temperature that the exhaust gas currently is, such that no change (via a downshift event) is necessary. In this regard, the current aftertreatment system 120 temperature is at or above the desired threshold temperature value such that additional load via management the transmission is determined by the controller 140 to be unnecessary. However, if the current temperature of the aftertreatment system 120 is below the threshold temperature value, the transmission circuit 224 determines that an increase in exhaust gas temperature is desired.

The transmission circuit 224 may also determine that a downshift event is desirable based on a sensed amount of EONOx in the exhaust gas. Because shifting to a lower gear can (in some situations) reduce the amount of EONOx generated by the engine 101, the transmission circuit 224 can determine that a downshift event is desirable in order to reduce the currently generated amount of EONOx. As such, if the transmission circuit 224 determines that the sensed amount of EONOx is above a threshold value for NOx, the transmission circuit 224 determines that a downshift event is desirable to reduce the EONOx. The threshold value for NOx may be pre-determined for the aftertreatment system 120 based on at least one of component specifications (e.g., a standard conversion efficiency of a particular SRC), jurisdictional emissions requirements, or estimated aftertreatment system 120 conversion efficiency (e.g., based on a temperature of the aftertreatment system 120). For example, if the aftertreatment system 120 is at a desired operating temperature or temperature range (e.g., 250° C.), the threshold value for NOx may be relatively higher because the transmission circuit 224 deprioritizes active management (e.g., via one or more downshift events) to reduce excess EONOx due to the aftertreatment system 120 being at an operation temperature.

In some embodiments, in response to determining that a downshift event is desired based on a desired exhaust gas temperature, the transmission circuit 224 determines a desired lower gear as the gear for the transmission (e.g., one-lower gear than the current gear, two lower gears than the current gear, three lower gears than the current gear, etc.). For example, if the powertrain 110 is currently operating in 4th gear and the transmission circuit 224 determines that a downshift event is desired based on the exhaust gas temperature, the transmission circuit 224 determines that the desired lower gear (i.e., target gear) is the (in this example) $3^{rd}$ gear. In other embodiments, once the transmission circuit 224 has determined the desired exhaust gas temperature increase (based on the difference between the current aftertreatment system 120 temperature and a target aftertreatment system 120 temperature), the transmission circuit 224 determines a transmission gear setting that corresponds to the determined exhaust gas temperature increase. This determination may be made using a lookup table, a formula, or any other suitable method. For example, if the desired exhaust gas temperature increase is large (e.g., 50° C.), the transmission circuit 224 may determine that the lower gear is two gears below the current gear (e.g., the current gear is $4^{th}$, so the target gear is $2^{nd}$).

In some embodiments, in response to determining that a transmission event (in particular, a downshift event) is desired based on an amount of EONOx (e.g., a current amount of EONOx is at or above a predefined threshold value), the transmission circuit 224 determines a desired lower gear for the transmission (e.g., one-lower gear than the current gear, two lower gears than the current gear, three lower gears than the current gear, etc.). For example, if the powertrain 110 is currently operating in $4^{th}$ gear and the transmission circuit 224 determines that a downshift event is desired to reduce the EONOx amount, the transmission circuit 224 determines that the desired lower gear (i.e., target gear) is (in this example) the $3^{rd}$ gear. In other embodiments, once the transmission circuit 224 has determined the desired EONOx decrease (based on the difference between the sensed EONOx amount and a target EONOx amount), the transmission circuit 224 determines a transmission setting that corresponds to the determined EONOx decrease. This determination may be made using a lookup table, a formula, or any other suitable method. For example, if the desired EONOx decrease is large relative to the current EONOx amount (e.g., greater than a predefined values, such as X ppm), the transmission circuit 224 may determine that the lower gear is two gears below the current gear (e.g., the current gear is $4^{th}$, so the target gear is $2^{nd}$).

In some embodiments, the transmission circuit 224 estimates a change in exhaust gas temperature and/or EONOx for all or substantially all available transmission settings (i.e., gears) and determines the desired gear based on the results of the estimations. The transmission circuit 224 may estimate the changes utilizing one or more operating parameters, including but not limited to engine 101 speed, engine 101 torque, engine 101 load, current transmission 102 setting, current exhaust gas temperature, sensed EONOx amount, and look-ahead road grade data. From there, the transmission circuit 224 determines which transmission setting aligns best with a desired change. For example, if an increase in exhaust gas temperature is desired (based on a current aftertreatment system 120 temperature), the transmission circuit 224 selects the transmission setting that would result in the greatest estimated increase in exhaust gas temperature. Because the transmission circuit 224 is estimating changes for all (or substantially all) transmission settings, the selected transmission setting may be a lower gear (i.e., transmission circuit 224 determines a downshift event) or a higher gear (i.e., transmission circuit 224 determines an upshift event).

From there, the transmission circuit 224 initiates the downshift (or upshift) event by increasing the load on the engine 101 to decelerate the engine 101 to a speed corresponding to the shift event, and then commands the transmission 102 to selectively perform the shift event, provided that the user has not disabled downshifting (e.g., via the operator I/O device 130). For example, the user may have disabled downshifting if the vehicle 100 is attempting to pass another vehicle, as a downshift event would cause a momentary loss of power to the drivetrain (when the clutch activates). Further, similarly to as described above for upshift events, the transmission circuit 224 directs the mechanical energy generated from the additional load on the engine 101 to the motor generator 106, which converts the mechanical energy to thermal energy in the aftertreatment system 120 via the heater 125. In this way, the transmission circuit 224 not only improves aftertreatment system 120 performance in a more fuel-efficient manner through downshifting, but also utilizes the mechanical energy generated in the shift that might otherwise have been wasted or not harnessed.

Figure 7:
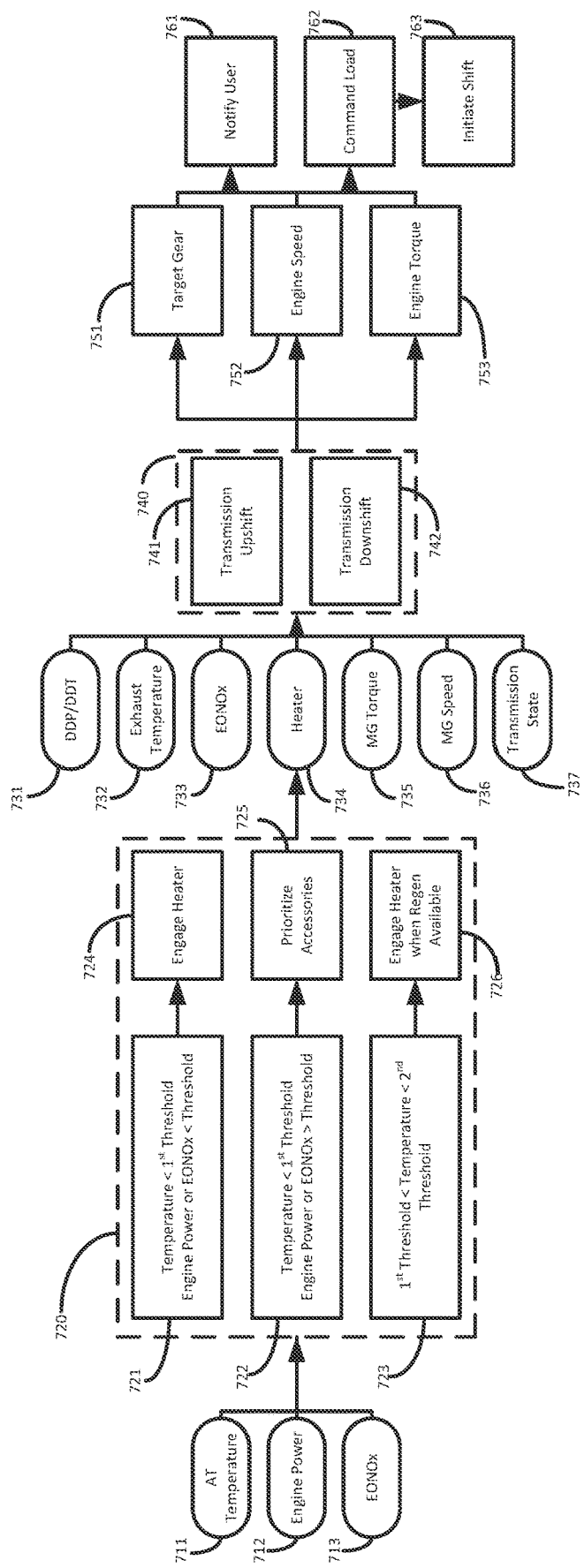
FIG. 7 is a flowchart illustrating a method for reducing emissions based in part on an amount of available regenerative braking energy, according to an exemplary embodiment.

Referring now to FIG. 7, a flowchart illustrating a method 700 for reducing emissions based in part on an amount of available regenerative energy is shown, according to an exemplary embodiment. In one embodiment, the method 700 is performed by the controller 140 utilizing one or more of the engine circuit 220, the heater circuit 222, and the transmission circuit 224. As shown in FIG. 7, the method 700 begins with steps 711-713, where the controller 140 receives information indicative of a temperature of the aftertreatment system 120 at 711, a power output of the engine 101 at 712, and an amount of EONOx at 713. From there, the method proceeds to block 720 and performs steps 724-726 depending on determinations made by the controller 140 at steps 721-723 based on information from 711-713. In response to determining that the aftertreatment system 120 temperature is less than a first threshold (i.e., the first temperature threshold of the heater circuit 222) and one or both of the engine 101 power output and EONOx are less than a corresponding threshold (i.e., the power threshold and EONOx thresholds of the heater circuit 222) at 721, the controller 140 engages the heater 125 at 724. In response to determining that the aftertreatment system 120 temperature is less than the first temperature threshold and one or both of the engine 101 power output and EONOx are greater than the corresponding threshold at 722, the controller 140 disengages or reduces power consumption from one or more accessories at 725 in the manner discussed above with regard to the heater circuit 222 (i.e., non-necessary accessories are adjusted/disengaged based on a desired reduction on engine 101 load). In response to determining that the aftertreatment system 120 temperature is greater than the first temperature threshold and less than a second temperature threshold at 723, the controller 140 engages the heater 125 at 726 only when regenerative braking energy is available.

From block 720, the method proceeds to steps 731-737, where the controller 140 receives additional information indicative of driver-demanded power (DDP) and driver-demanded torque (DDT) at 731 (i.e., via the I/O device 130 or based on an accelerator pedal position (APP)), exhaust gas temperature at 732, EONOx at 733, heater 125 status (i.e., whether the heater 125 is 'on' and, if so, at what power?) at 734 (determined, in part, as a result of 720), motor generator 106 torque at 735, motor generator 106 speed at 736, and transmission 102 state (i.e., current gear) at 737. Based on this information, the method 700 proceeds to block 740, where the controller 140 assists with an upshift event at 741 or initiates a downshift event at 742. At 741, the controller 140 increases a load on the engine 101 in order to decelerate the engine 101 and improve the smoothness and utility of the upshift event by harnessing otherwise wasted energy to assist aftertreatment system 120 functionality. At 742, the controller 140 increases a load on the engine 101 in order to decelerate the engine 101 for a subsequent downshift event. Subsequently, a downshift event is initiated. If the transmission 102 is a manual transmission, 'initiating the downshift event' may refer to the controller 140 notifying the user that the speed of the engine 101 matches the target shift speed (e.g., via the I/O device 130) and to perform the shift. If the transmission 102 is an automatic transmission, 'initiating the downshift event' refers to the controller 140 commanding the transmission 102 to shift from the current gear down to the target gear. By initiating the downshift event, the controller 140 further increases the load on the engine 101, which increases a temperature of the exhaust gas and improves aftertreatment system 120 functionality. As a result of the block 740, the method 700 outputs a target gear at 751, a target engine 101 speed at 752, and a target engine 101 torque at 753. Based on these outputs, the method 700 proceeds to 761 in some embodiments and to 762 in other embodiments. At 761, the controller 140 notifies the user (via the I/O device 130) of the target gear and target engine 101 speed for the gearshift event (i.e., either downshift event or upshift event) and, in some embodiments, notifies the user when the current engine 101 speed is at the target engine 101 speed for the gear shift event. At 762, the controller 140 commands an additional load on the engine 101 based on the target engine 101 speed via the motor generator 106 or accessories, and at 763, initiates the downshift event or upshift event once the current engine 101 speed reaches target engine 101 speed.

Figure 8:
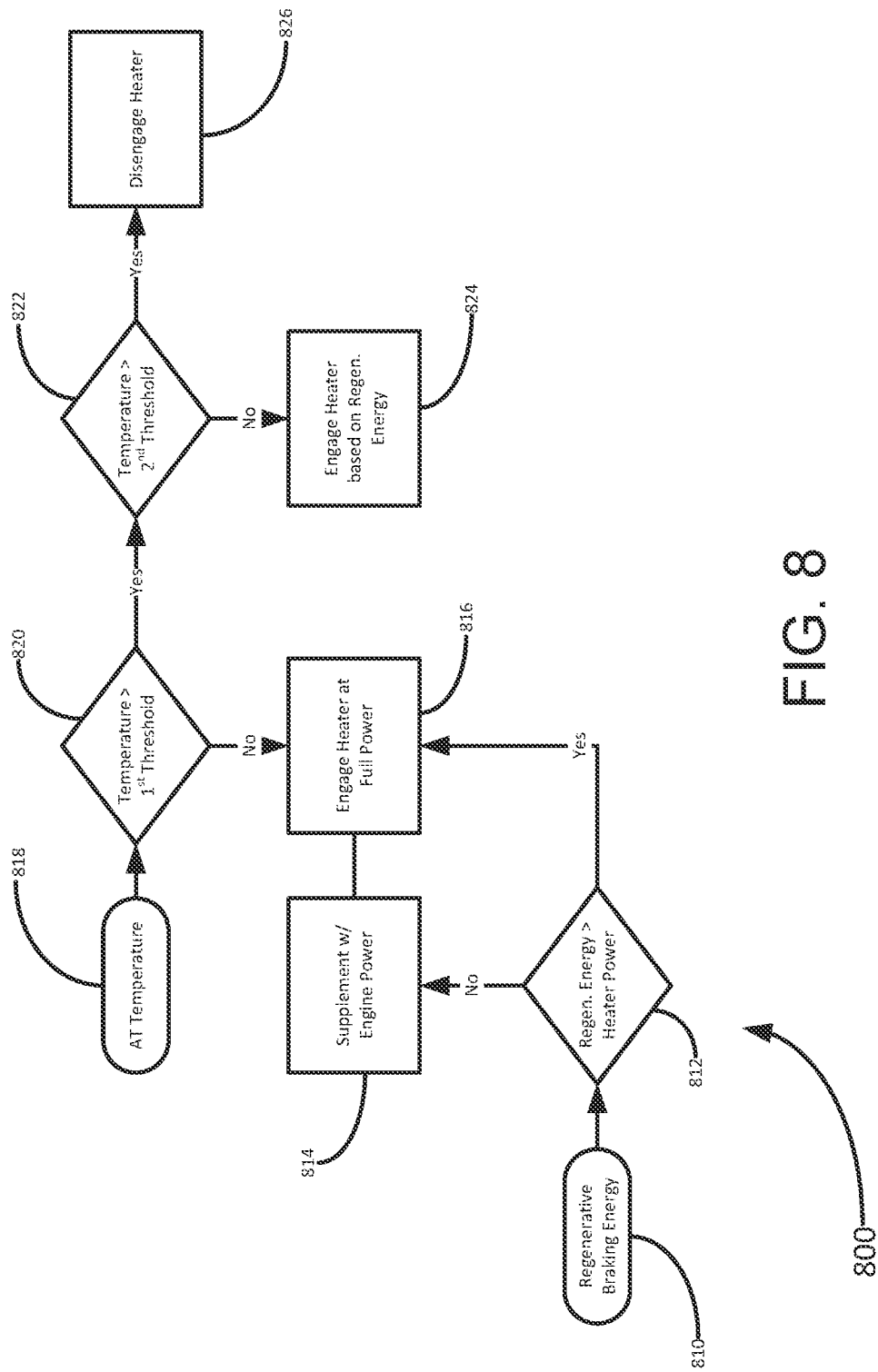
FIG. 8 is a flowchart illustrating a method for managing a heater of an aftertreatment system, according to an exemplary embodiment.

Referring now to FIG. 8, a flowchart illustrating a method 800 for managing the heater 125, according to an exemplary embodiment. In one embodiment, the method 800 is performed by the controller 140. The method 800 begins at 810, where the controller 140 receives information indicative of the available amount of regenerative braking energy or that regenerative braking energy is available. At 812, the controller 140 determines if the amount of regenerative braking energy available is greater than an amount of power required to operate the heater 125 at full power. For example, the regenerative braking energy amount may be determined via a voltage sensor or other estimators within the inverter, which the controller 140 then compares to the power level necessary to operate the heater 125 at a full power output. If the available regenerative braking energy is sufficient to operate the heater 125 at full power (812:YES), the method 800 proceeds to 816 and engages the heater 125 at full power. If the available regenerative braking energy is not enough to engage the heater 125 at full power (812:NO), the method proceeds to 814 and supplements the available regenerative braking energy with engine 101 power. The amount of this supplemented engine 101 power is equal (or substantially equal) to the amount of power required to operate the heater 125 at full power minus the amount of available regenerative braking power. From there, the method 800 proceeds to 816 to engage the heater 125 at full power, using the combination of captured regenerative braking energy and engine 101 power.

In parallel, the controller 140 receives information indicative of a temperature of the aftertreatment system 120 at 818. From there, the method 800 proceeds to 820, where the controller 140 determines if the aftertreatment system 120 temperature exceeds a first threshold (i.e., the first temperature threshold of the heater circuit 222). If the aftertreatment system 120 temperature does not exceed the first threshold (820:NO), the controller 140 operates the heater 125 at full power at 816. If the aftertreatment system 120 temperature exceeds the first threshold (820: YES), the controller 140 determines if the aftertreatment system 120 temperature exceeds a second threshold (i.e., the second temperature threshold of the heater circuit 222). If the aftertreatment system 120 temperature does not exceed the second threshold (822:NO), the controller 140 engages the heater 125 to operate the heater 125 based on the amount of available regenerative braking energy/power. For example, the controller 140 may operate the heater 125 at full power if there is sufficient regenerative braking energy/power available for full power operation. As another example, the controller 125 may operate the heater at less than full power if the available regenerative braking power is insufficient for full power operation. In one embodiment, the controller 140 diverts a portion of the generated electricity from the motor generator 106 to the aftertreatment system heater 125 and operates the heater 125 for as long as possible with this power (i.e., until insufficient generated electricity remains). In another embodiment, the controller 140 diverts a majority of the generated electricity from the motor generator 106 in order to operate the heater 125 at maximum (or substantially maximum) power for as long as possible. Put differently, if the amount of generated electricity from the motor generator 106 is insufficient for full power operation, the controller 140 may either run the heater 125 at a relatively high (e.g., as high as possible) power for a relatively short amount of time or run the heater 125 at a relatively low power (i.e., compared to the high power of the first embodiment) for a relatively long amount of time (i.e., compared to the short time of the first embodiment). If the aftertreatment system 120 temperature exceeds the second threshold (822: YES), the controller 140 disengages the heater 125, regardless of the amount of available regenerative braking energy.

The systems and methods described herein provide improvements and benefits beyond conventional systems and methods for heater and transmission management. In particular, by engaging an aftertreatment system heater whenever regenerative braking energy is available, the present systems and methods reduce the necessity or frequency of conventional thermal management events. Conventional thermal management events require high levels of fueling, so avoiding these events not only reducing fuel consumption but also reduces $CO_2$ and other pollutants otherwise produced by excess fueling.

In another example, by utilizing regenerative braking energy when available, the present systems and methods reduce overall energy consumption and improve system efficiency, as compared to conventional energy systems that generate and store electricity in one or more batteries. By operating in a more first-in-first-out manner (i.e., using only the energy that is 'free' or otherwise available), the present systems and methods avoid losing energy inside the battery (batteries have internal resistance) or generating excess energy just for the sake of generating excess energy.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples). It is also important to note that the construction and arrangement of the apparatuses, methods, and system as shown in the various exemplary embodiments herein is illustrative only. Additionally, any element disclosed in one embodiment may be incorporated or utilized with any other embodiment disclosed herein. Moreover and although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 5, it should be understood that the controller 140 may include any number of circuits for completing the functions described herein. For example, the activities and functionalities of the engine circuit 220, the heater circuit 222, and the transmission circuit 224 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium (e.g., the memory 206) storing instructions for execution by various types of processors, such as the processor 204 of FIG. 5. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. To that end, a "circuit" as described herein may include components that are distributed across one or more locations. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In some embodiments, the one or more processors may be external to the apparatus (e.g., the controller shown herein), for example the one or more processors may be a remote processor (e.g., a cloud based processor). Alternatively or additionally, the one or more processors may be internal and/or local to the apparatus (e.g., the controller shown herein). In this regard, a given circuit or components thereof may be disposed locally (e.g., as part of a local server, a local computing system such as the one or more controllers described herein, etc.) or remotely (e.g., as part of a remote server such as a cloud based server).

Embodiments within the scope of the present disclosure include program products comprising computer or machine-readable media (e.g., memory 206) for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal media. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the apparatus/computing device (e.g., controller), partly on the apparatus/computing device (e.g., controller), as a stand-alone computer-readable package, partly on the apparatus/computing device and partly on a remote computer or entirely on the remote computer or server. In the latter scenario, the remote computer may be connected to the apparatus/computing device (e.g., controller) through any type of network, including a local area network (LAN) or a wide area network (WAN), or the connection may be made to an external computer (for example, through the Internet using an Internet Service Provider).

The program code may be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

What is claimed is:

1. A method, comprising:
   receiving, by a controller, information indicative of a temperature of an aftertreatment system of a vehicle and a power output of an engine of the vehicle;
   comparing, by the controller, the temperature of the aftertreatment system to a temperature threshold;
   comparing, by the controller, the power output to a power output threshold;
   responsive to the comparisons indicating that the temperature of the aftertreatment system is below the temperature threshold and the power output of the engine is below the power output threshold, engaging an aftertreatment system heater;
   responsive to the comparisons indicating that the temperature of the aftertreatment system is below the temperature threshold and the power output of the engine is above the power output threshold, reducing a power consumption from the aftertreatment system heater; and
   responsive to the comparisons indicating that the temperature of the aftertreatment system is above the temperature threshold and the power output of the engine is above the power output threshold, disengaging the aftertreatment system heater.

2. The method of claim 1, further comprising:
   receiving, by the controller, a sensed amount of engine-out NOx (EONOx);
   comparing, by the controller, the sensed amount of engine-out Nox (EONOX) to a predefined threshold EONOx; and
   responsive to the comparison indicating that the sensed EONOx amount is above the predefined threshold EONOx, at least one of disengaging or reducing, by the controller, a power consumption from the aftertreatment system heater or one or more accessories.

3. The method of claim 1, wherein the temperature threshold comprises a first temperature threshold and a second temperature threshold, the second temperature threshold greater than the first temperature threshold.

4. The method of claim 3, further comprising:
   responsive to the comparison indicating that the temperature of the aftertreatment system is above the first temperature threshold and below the second temperature threshold, engaging the aftertreatment system heater in response to regenerative braking energy being available.

5. The method of claim 3, further comprising:
   responsive to the comparison indicating that the temperature of the aftertreatment system is above the first temperature threshold and the second temperature threshold, disengaging the aftertreatment system heater.

6. The method of claim 1, wherein the vehicle is a hybrid vehicle including a motor generator, wherein the method further includes diverting generated electricity from the motor generator to the aftertreatment system heater without storing the generated electricity in a battery.

7. The method of claim 1, further comprising in response to the temperature of the aftertreatment system being below the temperature threshold, commanding the aftertreatment system heater to engage and at least one of reducing a power demand from or turning off an electronic heating ventilation and air conditioning system of the vehicle.

8. A method, comprising:
   receiving, by a controller, information indicative of operation of an engine of a vehicle;
   determining, by the controller and based on the information indicative of operation of the engine, a shift event for a transmission coupled to the engine;
   commanding, by the controller, an increased load on the engine from a motor generator of the vehicle to decrease a speed of the engine, the increased load causing the motor generator to generate additional power;
   directing, by the controller, the additional power to an aftertreatment system heater of the vehicle; and
   implementing, by the controller, the determined shift event with the transmission.

9. The method of claim 8, wherein the shift event is an upshift, and
   wherein the increased load is proportional to a difference between a current speed of the engine and a target engine speed for the determined shift event.

10. The method of claim 8, wherein the shift event is a downshift, and
    wherein the determination of the downshift is based on one or more of a current temperature of an aftertreatment system of the vehicle being less than a threshold exhaust aftertreatment system temperature value, and a sensed amount of engine-out NOx (EONOx) being above an EONOx threshold value.

11. A system for a hybrid vehicle, comprising:
    a motor generator; and
    a controller coupled to the motor generator and comprising at least one processor coupled to a memory storing instructions therein that, when executed by the at least one processor, cause the at least one processor to perform operations comprising:
      receive information indicative of a temperature of an aftertreatment system of the hybrid vehicle and a power output of an engine of the hybrid vehicle;
      compare the temperature of the aftertreatment system to a temperature threshold;
      compare the power output to a power output threshold;
      responsive to the comparisons indicating that the temperature of the aftertreatment system is below the temperature threshold and the power output of the engine is below the power output threshold, engage an aftertreatment system heater;
      responsive to the comparisons indicating that the temperature of the aftertreatment system is below the temperature threshold and the power output of the engine is above the power output threshold, reduce a power consumption from the aftertreatment system heater; and responsive to the comparisons indicating that the temperature of the aftertreatment system is above the temperature threshold and the power output of the engine is above the power output threshold, disengage the aftertreatment system heater.

12. The system of claim 11, wherein the motor generator captures energy to generate electricity, and wherein the operations further comprise directing the generated electricity to the heater.

13. The system of claim 11, wherein the operations further include diverting generated electricity from the motor generator to the aftertreatment system heater without storing the generated electricity in a battery.

14. The system of claim 11, the operations further comprising:
   responsive to the temperature of the aftertreatment system being below the temperature threshold, commanding the aftertreatment system heater to engage and at least one of reducing a power demand from or turning off an electronic heating ventilation and air conditioning system of the vehicle.

15. The system of claim 11,
wherein the temperature threshold comprises a first temperature threshold and a second temperature threshold; and the operations further comprising that in response to the comparison indicating that the temperature of the aftertreatment system is above the first temperature threshold and below the second temperature threshold, engage the aftertreatment system heater in response to regenerative braking energy being available.

16. The system of claim 11,
wherein the temperature threshold comprises a first temperature threshold and a second temperature threshold; and the operations further comprising in response to the comparison indicating that the temperature of the aftertreatment system is above the first temperature threshold and second temperature threshold, turn off the aftertreatment system heater.

\* \* \* \* \*